United States Patent [19]
Bellomo

[11] 3,919,861
[45] Nov. 18, 1975

[54] HOMOKINETIC JOINT

[76] Inventor: Andrea Bellomo, Strada Sant' Anna No. 82/6, Turin, Italy

[22] Filed: Jan. 4, 1971

[21] Appl. No.: 103,490

[30] Foreign Application Priority Data
Jan. 21, 1970 Italy .................................. 67160/70

[52] U.S. Cl. ................................................. 64/21
[51] Int. Cl. ............................................. F16d 3/30
[58] Field of Search .............................. 64/8, 21, 16

[56] References Cited
UNITED STATES PATENTS
3,362,192   1/1968   Orain ..................................... 64/21
3,475,924   11/1969  Aucktor ................................. 64/21

*Primary Examiner*—Edward G. Favors
*Attorney, Agent, or Firm*—Richards & Geier

[57] ABSTRACT

Constant velocity universal joint, for the transmission of power between two shafts capable of relative angular shifting, comprising an inner spherical element, having six curved grooves on its surface, located in the inner sperical surface, having six curved grooves, of another element, ring or bell-shaped, and six balls, each ball being engaged by two crossed grooves, one on the inner element and one on the other element.

7 Claims, 11 Drawing Figures

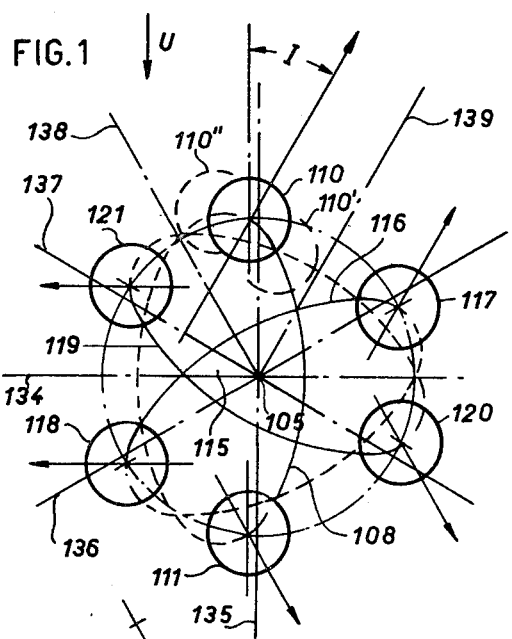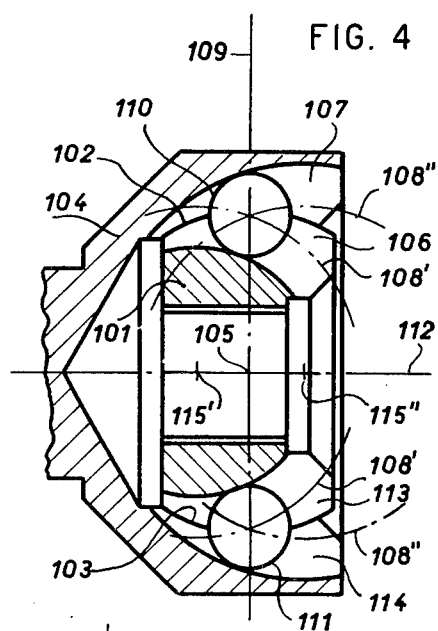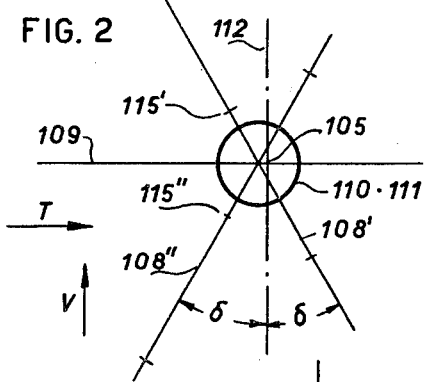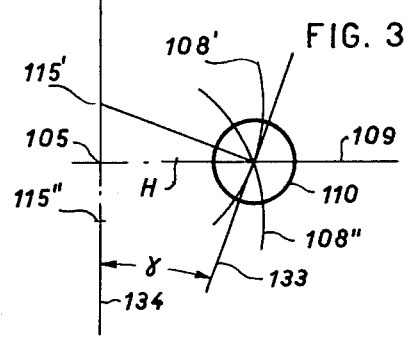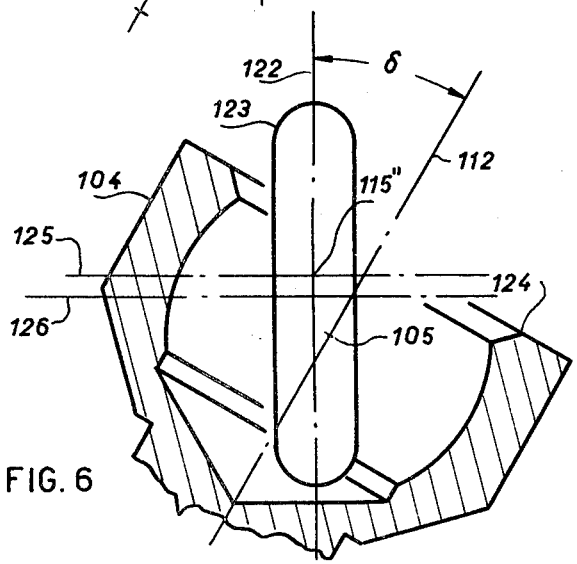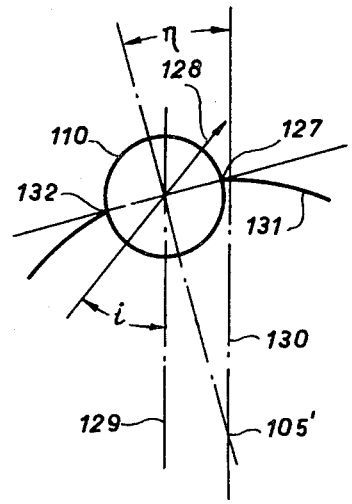
Inventor:
A. Bellomo

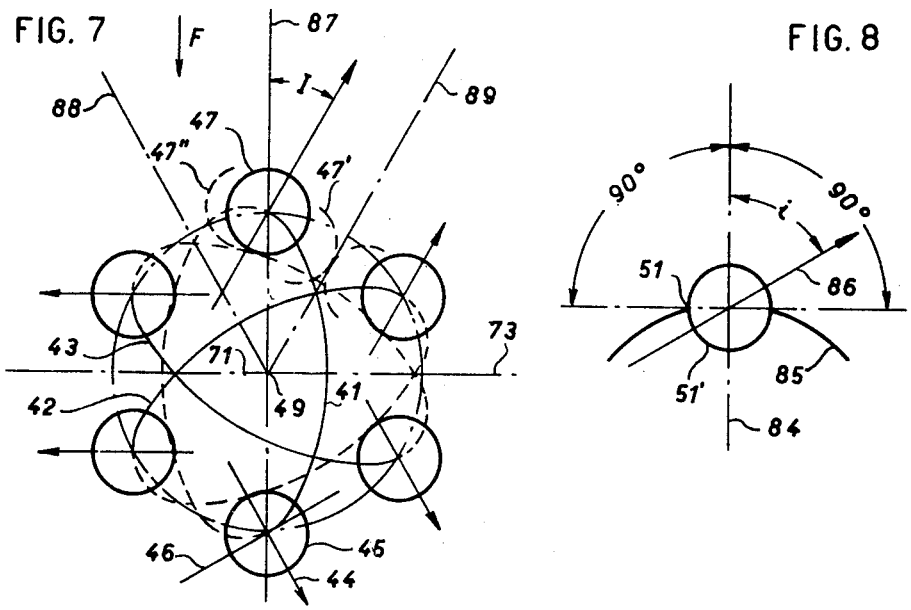
FIG. 7
FIG. 8
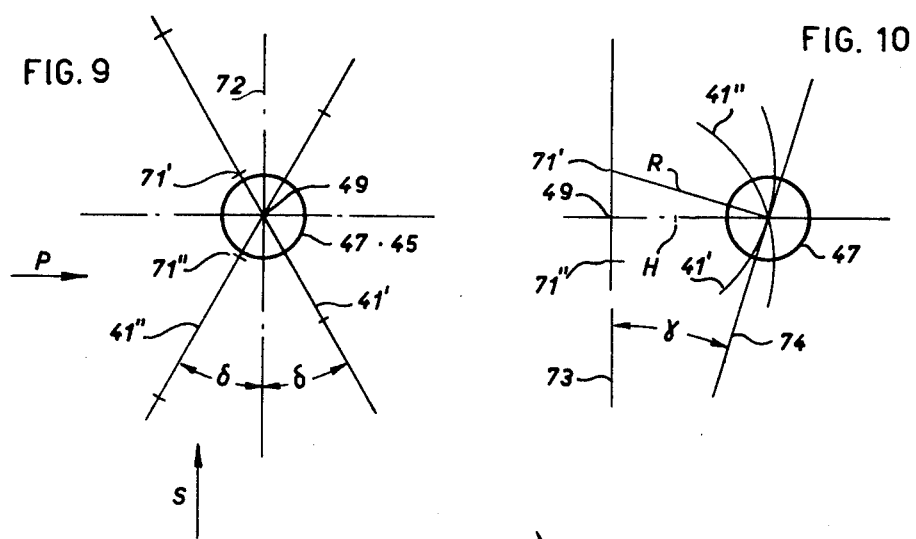
FIG. 9
FIG. 10
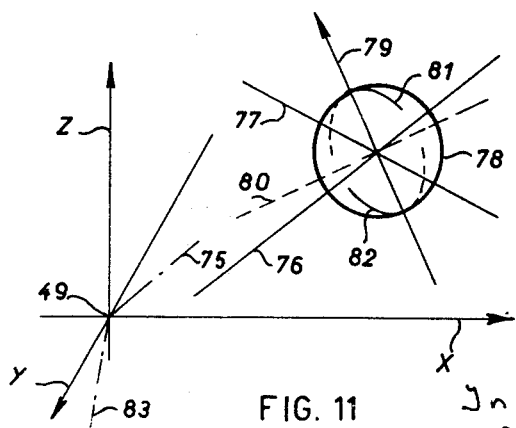
FIG. 11
Inventor:
A. Bellomo

HOMOKINETIC JOINT

The present invention relates to a homokinetic joint for the transmission of power between two shafts capable of relative angular shifting. It comprises an inner spherical element, having curved grooves on its surface, located in the inner spherical surface, having curved grooves, of an outer element, ring or bell-shaped, and an even number of balls, each ball being engaged by two grooves, one on the inner element and one on the outer element, symmetrically crossing in the bisecting plane of the angle between the geometrical axes of the shafts connected by the joint. The groove geometry compels the driving balls to lie on said bisecting plane without the aid of a cage or similar means.

One half of the balls transmit the torque in one direction and the other half in the opposite direction.

The common center of the spherical surfaces of the two elements is 'the spherical center' of the joint in which the two geometrical axes of the shafts connected by the joint converge. Any plane whatsoever containing the spherical center will be called a 'meridian plane' and the meridian plane perpendicular to the axis of the aligned shafts will be called 'equatorial plane.' We call the line drawn from the center of a ball moving on the groove with contact with it 'geometrical axis of a groove.'

With reference to FIG. 7, 8, 9, and 10 a joint of the above-mentioned type is described which must be considered "Former technique" with respect to the present invention which will be described later with reference to FIGS. from 1 to 6.

With reference to FIG. 11 the general theoretical principles will be related. FIG. 7, 8, 9 and 10 relate to a joint having six balls equispaced in the equatorial plane. In this joint two opposite grooves of the same element are arcs of the same circle eccentric with respect to the spherical center of the joint; this circle lies in a meridian plane, inclined with respect to the axis of the element itself.

The centers of the circles forming the geometrical axes of the grooves of one element are all on one side and the centers of the circles relative to the other element are all on the opposite side with respect to the equatorial plane. FIG. 9 shows, following arrow F, the meridian planes containing the circles 41' and 41", which are geometrical axes of the grooves of the two elements engaging the opposite balls 47 and 45; these planes are inclined, with respect to the axis 72 of the aligned shafts, in opposite directions to the same angle δ and the centers 71' and 71" of the circles are equispaced from the spherical center 49 of the joint. The ellipse 41 in FIG. 7 is the common projection in the equatorial plane, following arrow S, of the circles 41' and 41" and 71 is the common projection of the centers 71' and 71".

In the same way, the ellipses 42 and 43 refer to the other two couples of opposite balls. FIG. 10 is a view, in direction of the arrow P, of the arcs of circle 41' and 41" engaging the ball 47, the said arcs being brought to lie in the plane of the drawing nullifying the inclinations δ. No. 74 indicates the tangent to the circle 41' of radius R; this tangent is at angle γ with respect to the plane 73 perpendicular to the line joining the centres of the oposite balls 47 and 45. The action lines of the forces acting through the balls, when the joint works at aligned shafts, are indicated in FIG. 7 with arrows such as the force 44 transmitted from the ball 45; this force is at right angles to the tangent 46 to the ellipse 41 through the center of the ball 45, as shown in my article: "I GIUNTI OMOCINETICI A SFERE" (Homokinetic ball joints) published in Italy in July 1957 in the magazine of the Associazione tecnica dell'Automobile, member of FISITA, Federation International des Societes d'ingenieurs des techniques de l'automobile.

In the above-mentioned article I demonstrated, as explained in FIG. 11, that the action line of the force 79 coincides with the intersection in the bisecting plane XZ of the planes of the cross sections 81 and 82 of the grooves engaged by the ball 78 being consequently at right angles to the common projection 80 on the said bisecting plane of the tangents 76 and 77 to the geometrical axes of the grooves themselves, passing through the center of the ball. In FIG. 11 the axes 75 and 83 of the shafts connected by the joint lie on the plane XY, XYZ being a tern of orthogonal axes.

I have established that the inclination I of the force in the bisecting plane with respect to the line joining the centers of opposite balls, when the joint works at aligned, is given by the relation: $\tan I = \tan \gamma / \sin \delta$, in which $\gamma$ and $\delta$ are the angles indicated in FIG. 9 and 10.

I have also established that when the joint works with an angle between the axes of the shafts, the inclination of the force oscillates, during one revolution, and the max. value of this inclination, in the cross section of the groove with respect to the plane (as 84 in FIG. 8) containing the geometrical axis of the groove itself, hardly varies from that given by the expression: $\tan i = \sin \gamma / \tan (\delta - \frac{1}{2}\alpha)$.

The said max. inclination is realized when the line joining the center of the above mentioned ball with the center of the opposite ball is at right angles to the plane containing the geometrical axes of the shafts connected by the joint and the dihedral angle of the planes containing the geometrical axes of the grooves engaged by the said ball is reduced to $(2 \delta - \alpha)$. Even if in this position, as shown in FIG. 8, the spherical surface 85 of articulation of the two elements of the joint cuts on both grooves arcs of contact with the ball having amplitude 180°, nevertheless in this position there is the minimum distance between the action line 86 of the force and the edge 51 of the groove, in other words there is the minimum bearing and guiding arc for the ball, this arc being located between the said edge 51 and the point 51' 1 symmetrical with respect to the force 86. On the other hand, in the other sections the bearing and guiding arc for the ball is larger because the inclination of the force is smaller even if the contact of the ball with one of the grooves is less than 180°.

In order to increase the bearing and guiding arc for the ball in the above-mentioned critical position it is necessary to reduce the inclination $i$, namely to adopt the max possible inclination $\delta$ as shown in the expression $\tan i$ (sec above).

For a given ratio $d/H$ between the diameter of the driving ball and the semidistance between the centers of two opposite balls at aligned shafts, a ball such as 47 runs on the groove of an element between two extreme positions 47' and 47" functions of $\delta$ and $\alpha$.

In order to prevent the contact of two contiguous balls, the above-said extreme positions must be contained in the dihedral angle of 60° delimited in FIG. 7 by the meridian planes 88 and 89 at equal angular distance from the meridian plane 87 containing, at aligned shafts, the center of the ball.

From this observation it follows that the said joint is capable of a limited torque and angular shifting because the inclination δ is limited by the contact betwen the ball with the plane 89 at limit position in 47′, while in 47″, at the other end of the run, there is a considerable margin which is not used. If, in order to increase δ the ration $d/H$ is reduced, the torque which can be transmitted is reduced, too, and if δ is reduced, the critical arc 51–51′ is reduced too, and this leads to insufficient bearing and guiding of the ball on the bisecting plane and in any case to concentration of tensions on the edge of the groove.

Supposing, for instance, $H = 2d$ and $B = d$ lever of the force with respect to the spherical center 49, being at aligned $B = H \cdot \sin I$, it follows that $I = 30°$ in FIG. 7. Supposing that the joint must work at an angular shifting of up to $\alpha = 42°$, the max usable value of δ will be 30° or little more and therefore $i = 60°16′$ which means a rather insufficient critical bearing and driving arc 51–51′, namely $2(90° - i) = 59°28′$. This means that a joint manufactured with the above-said former technique with the above said dimensions cannot work usefully up to 42° and is in any case subject to a fast decreasing of the torque capacity with the increasing of the working angle.

Moreover, according to the former technique, the cross section of the groove is an arc of a circle having a larger radius than the one of the engaged ball in order to prevent, under load, stressing on the edge of the groove. This, however, gives place to difficulties because it moves the action line of the force with respect to the theoretical position sometimes reducing the critical arc of bearing and guiding of the ball.

With respect to the former technique up to now expounded, the present invention corrects the geometry of the joint in order to reduce the max inclination of the force and consequently to increase the critical bearing and guiding arc for the ball, allowing, in other words, the increase of the transmissible torque at a given working angle. One more purpose of the invention is to further improve the baring and guiding of the ball and to define the triangle of the transmission forces by machining the grooves with a circular cross section, having a radius equal to the one of the ball, within the limits of an accurate machining, and this even with a preloading between each pair of grooves and the ball engaged by them.

A further purpose of the invention, which will be explained later, is to facilitate the simultaneous machining of two opposite grooves in the outer element of the joint.

FIG. 1 shows, at aligned shafts, the geometrical axes of the grooves, projected on the equatorial plane, of a six ball joint.

FIG. 2 is a view in direction of the arrow U of the planes containing the circles 108′ and 108″ which are the geometrical axes of the grooves engaging the opposite balls 110 and 111 of FIG. 1.

FIG. 3 is a view, in direction of the arrow T of FIG. 2, of the arcs of circle 108′ and 108″, engaging the ball 110, brought to lie on a plane parallel to the one of the drawing.

FIG. 4 is a section of the joint, made by the plane 135 of FIG. 1, in which the grooves of the two elements are represented by the respective geommetrical axes brought to lie on a plane parallel to the one of the drawing.

FIG. 5 shows the cross sections of the grooves cut by the spherical surface of articulation of the two elements.

FIG. 6 shows the tool in position ready to machine simultaneously two opposite grooves in the outer element of the joint.

FIGS. 7 to 11 are diagrams illustrating the above-described theoretical principles.

As shown in FIG. 4 the inner element 101 is limited by the spherical surface 102 which is located with articulation in the inner spherical surface 103 of the outer element 104.

These spherical surfaces have a common center in 105, which is the spherical center of the joint. Each one of the six driving balls is engaged by a curved groove 106 of the inner element and by a curved groove 107 of the outer element, whose geometrical axes, respectively 108′ and 108″, cross symmetrically in the center of the ball 110 on the equatorial plane 109 which is at right angles with the axis 112 of the aligned shafts. The grooves 106 and 113 of the inner element, engaging the opposite balls 110 and 111, have a common geometrical axis 108′ and the relative grooves 107 and 114 of the outer element have common geometrical axis 108″. As shown in FIG. 2 the said geometrical axes 108′ and 108″ are circles which lie on planes at an equal distance $t$ from the spherical center 105 of the joint at opposite inclinations with the same angle δ with respect to the axis 112 of the aligned shafts, the centers 115′ and 115″ of the circles being symmetrical with respect to the equatorial plane 109. FIG. 3 shows the consequent angle γ between the tangent 133, from the center of the ball 110, to the circle 108′ and the plane 134 at right angles to the line joining the center of the ball itself with the center of the opposite ball 111. The centers, such as 115′, of the three circles, such as 108′ which are the geometrical axes of the six grooves of the inner element, lie on a plane parallel to the equatorial plane 109 and are at equal distance from each other, and the corresponding centers, such as 115′, of the three circles, such as 108′, relative to the outer element are at the opposite side of the equatorial plane 109 and symmetrical to the former centers with respect to the said plane.

The ellipse 108, in FIG. 1, is the common projection on the equatorial plane 109, in direction of the arrow V of FIG. 2, of the circles 108′ relative to the grooves engaging the opposite balls 110 and 111 and the center 115 of the ellipse 108 is the common projection of the centers 115′ and 115″ of the said circles.

Similarly, the ellipses 116 and 119 are the common projections, on the equatorial plane, of the geometrical axes relative to the opposite balls 117 and 118 and respectively 120 and 121. The angular distance, on the equatorial plane, between two contiguous balls is alternately less and more than 60°, the balls being moved the distance $t/\cos δ$ alternately to the right and to the left of the meridian planes 135, 136 and 137 at equal angular distance.

The correction $t$ is established in order to obtain the max inclinaion δ compatible with the requirement that the excursion from 110′ to 110″ of a ball such as 110 along a groove of one element, excursion imposed by the angle $\alpha$ of the joint, should be within the dihedral angle of 60° limited by the meridian planes 138 and 139 at equal angular distance from the meridian plane 135 containing the axis of the relative element and parallel to the line joining the center of the ball 110, under consideration, with the center of the opposite ball 111.

However the correction $t$ reduces, by an angle $\eta$ the ball bearing and guiding arc as shown in FIG. 5 with reference to the position of the ball, later defined in which the inclination $i$ of the force is at its max value.

FIG. 5 shows, on the plane of the cross section of one or other of the grooves, with 105' the projection of the spherical center of the joint, with 131 the parallel cut by the said plane of the cross section on the spherical surface of the articulation of the two elements of the joint, with 129 the plane containing the geometrical axis 108' or 108'' of the groove under consideration and with 130 the meridian plane parallel to the 129, the distance between the planes 129 and 130 being namely the correction $t$.

In order to give the ball equal bearing arcs on the grooves, the circle 131 must cut the grooves in such a way that the line joining the edges 132 and 127 of the grooves themselves passes through the center of the ball 110 and is at right angles with the line joining the center of the ball with the center 105' of the circle 131, which line is inclined with respect to the meridian plane 130 of an angle $\eta$, which would be negative for the formation of the ball bearing and guiding arc, this are being double the angular distance between the edge 132 or 127 of the groove under consideration and the action line 128 of the force. However adopting suitable values of the correction $t$, values generally within 2/100 and 8/100 of the diameter of the driving ball, the said ball bearing and guiding arc, in the end, turns out to be greater than one which can be reached with the former technique since the inclination $i$ of the force decreases by an angle greater than $\eta$. Assuming, for instance, the same dimensions used for the former technique, $H = 2d$, $B = d$, and assuming the correction $t = 0,042$, $d$, it is possible to bring the inclination $\delta$ to the value $32°$ for a working angle of the joint of $42°$.

It ensues that $\eta = 1°16'$ and $i = 55°48''$ and the minimum ball bearing and guiding arc, when the joint works at $42°$, will be $2(90°-i-\eta) = 65° 52'$, considerably greater than that obtainable by the earlier technique, all other conditions being equal.

However even without increasing $\delta$, the correction $t$ determines on its own a reduction of the inclination of the force. In fact already with $\alpha= 0°$, namely at aligned shafts, the inclination of the force in the equatorial plane is given by the relation $B = H$ seen $I + t/\cos \delta \cdot \cos I$, while in the former technique the inclination is given by $B = H \cdot \sin I$ which gives a larger value of $I$, all other conditions being equal.

FIG. 6 shows the tool, cutter or grinder, 123 rotating around its axis 126 in the position to machine with only one operation two opposite grooves such as 107 and 114 in the outer element 104, shown sectioned by the plane 134 of FIG. 1, the said outer element having to rotate, during the machining, around the axis 125 passing through the center 115'' of the circle 108'', which is the common geometrical axis of the grooves under consideration. The said axis lies in the mean plane of the tool, the mean plane being at inclination of the angle $\delta$ with respect to the axis 112 of the piece.

As known, the piece can be kept steady by giving the tool, in addition to the rotation around its axis 126, a motion of planetarial rotation around the axis 125. In one way or the other the diameter of the toolshaft is limited by the distance between the axis 125 and the edge 124 of the element 104, the distance being larger than the one allowed by the former technique since the distance between the axis 125 and the spherical center 105 is larger, too, because of the correction $t$. This is an advantage for the machining because it allows the use of a tool-shaft with a larger diameter, which makes the said shaft more rigid, or, if the diameter of the shaft is kept the same, it is possible to use the tool even when its diameter has been reduced by wear in a larger measure than the one allowed by the former technique. The same advantage is obtained machining the groove with a lathe-tool, which is stronger and more rigid.

What is claimed is:

1. A homokinetic joint comprising as inner spherical element with curved grooves on its spherical surface located in the inner spherical surface, having curved grooves, of an outer element ring or bell, an even number of driving balls, each ball engaged by a groove of the inner element and by a groove of the outer element, these grooves crossing symmetrically in the equatorial plane, which is the plane containing the spherical center of articulation of the joint and is at right angles with the axis of the aligned shafts, the joint being characterized by the fact that the geometrical axes of two opposite grooves of each element are arcs of the same circle lying on a plane at inclination with respect to the axis of the aligned shafts and at a distance from the spherical center of the joint, this distance correcting the geometry of the joint increasing the bearing and guiding arc of the ball, the centers of the geometrical axes of the grooves of the inner element being all on a plane parallel to the above mentioned equatorial plane and at equal distance between each other and the centers of the geometrical axes of the grooves of the outer element being symmetrical to the before mentioned centers, relative to the inner element, with respect to the above mentioned equatorial plane.

2. Homokinetic joint, according with claim 1, in which the grooves engaging the driving balls have circular cross section.

3. Homokinetic joint according with claim 1 in which the cross section of the grooves is an arc of circle with radius equal to the one of the driving ball with severe machining tolerance.

4. Homokinetic joint according to claim 1 characterized by a pre-loading between each pair of grooves and the driving ball engaged by them.

5. Homokinetic joint according with claim 1 in which the spherical surfaces, outer for the inner element and inner for the outer one, cut in the cross section of the respective grooves equal bearing and guiding arcs for the driving balls when the line joining the centers of two opposite balls is at right angles with the plane containing the axes at angle of the shafts connected by the joint.

6. Homokinetic joint according with claim 1 in which two opposite grooves in the outer element are simultaneously machined, the rigidity and exploitation of the tool being increased owing to the distance between the plane containing the common geometrical axis of the said grooves and the spherical center of the joint.

7. Homokinetic joint according with claim 1 in which the number of the driving balls is six.

* * * * *